United States Patent [19]

Zabar

[11] Patent Number: 4,812,795

[45] Date of Patent: Mar. 14, 1989

[54] ELECTROMAGNETIC DEVICES HAVING SELECTIVELY MOVABLE CORE WINDING

[76] Inventor: Nachum Zabar, 4 Ravon Street, Givat Savion, Ganeh Tikvah, Israel

[21] Appl. No.: 43,764

[22] Filed: Apr. 29, 1987

[30] Foreign Application Priority Data

May 2, 1986 [IL] Israel ............................................ 78863
Sep. 29, 1986 [IL] Israel ............................................ 80173

[51] Int. Cl.⁴ .............................................. H01F 7/08
[52] U.S. Cl. ...................................... 335/258; 335/261; 335/278; 335/281
[58] Field of Search ............... 335/255, 256, 258, 259, 335/260, 261, 264, 266, 278, 279, 222, 223, 281

[56] References Cited

U.S. PATENT DOCUMENTS

| | | | |
|---|---|---|---|
| 750,132 | 1/1904 | Timmis et al. ................... | 335/261 |
| 1,123,411 | 1/1915 | Smith et al. ...................... | 335/223 |
| 3,335,385 | 8/1967 | Mower et al. .................... | 335/223 X |
| 4,698,608 | 10/1987 | Kimble ............................. | 335/222 |

Primary Examiner—George Harris
Attorney, Agent, or Firm—Larson & Taylor

[57] ABSTRACT

The invention provides an electromagnetic actuatable device including at least one current carrying winding having electrical terminals for applying voltage thereacross and a ferrymagnetic member configured to provide a closed magnetic flux path for magnetic flux induced by the winding when voltage is applied thereto. The member is at least partly disposed within the winding and has means locatable at least in proximity to the winding for modifying magnetic field intensity therethrough. One of the windings or members is adapted to be immobilized with respect to the other so that upon the application of voltage to the winding the non-immobilized winding or member is movable with respect to the other as a result of the force developed by the induced flux.

11 Claims, 3 Drawing Sheets

ELECTROMAGNETIC DEVICES HAVING SELECTIVELY MOVABLE CORE WINDING

The present invention relates to electromagnetic actuatable devices, such as relays, solenoids, linear or rotational motors, or the like. More particularly, the present invention is concerned with devices structured with constant air gaps or with gapless magnetic flux paths for the electromagnetic field produced when the devices are actuated.

Electromagnetic devices of the above described type are essentially composed of three parts: a current carrying wound wire, or coil, a movable member disposed within the coil and commonly referred to as a plunger, and an outer metal body or casing constituting, together with pole pieces, the magnetic (flux) circuit. Such structured devices have of necessity two types of air gaps: a substantially fixed annular gap between the plunger's body and the wall surrounding the plunger, and the so called, working gap, which is the air gap between an edge of the plunger and a pole piece. It is however recognized that the force developed by such a device is inversely proportional to the square of the air gap (mainly the working air gap) and thus attempts have been made for effectively shortening the working air gap by providing specific configuration to the plunger's edges and pole pieces, in order to diminish the influence of the air gap on the force produced. While these air gaps were reduced, thus improving the force to stroke relationship they were not entirely eliminated, and the force-stroke performance was not substantially improved. It is therefore a broad object of the present invention to provide electromagnetic actuatable devices of the kind hereinbefore described, without a working air gap, or with an air gap which remains constant in the magnetic circuit.

It is a further object of the present invention to provide electromagnetic actuatable devices of improved ratio of the force to the developed stroke.

It is still a further object of the invention to provide electromagnetic actuatable devices having a relative long stroke of the moving part.

In accordance with the invention there is therefore provided an electromagnetic actuatable device comprising:

at least one current carrying winding having electrical terminals for applying voltage thereacross: and a ferromagnetic member configured to provide a closed magnetic flux path for magnetic flux induced by the winding when voltage is applied thereto, said member being at least partly disposed within said winding and having means locatable at least in proximity to said winding for modifying magnetic field intensity therethrough:

wherein one of said winding or member is adapted to be immobilized with respect to the other so that upon the application of voltage to said winding the non-immobilized winding or member is movable with respect to the other as a result of the force developed by said induced flux.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
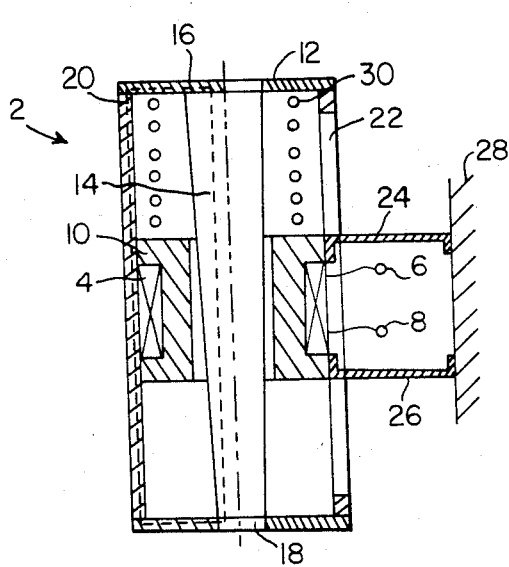
FIG. 1 is a cross-sectional view across a first embodiment of a gapless, electromagnetic actuatable device according to the present invention.

There is shown in FIG. 1 a first embodiment of the electromagnetic actuatable device according to the invention structured and operatable as a solenoid. The device 2 comprises a current carrying winding 4 having electrical terminals 6 and 8 for applying voltage thereacross. The winding 4 is embedded in a body 10 made of any suitable diamagnetic or paramagnetic material. Partly disposed within the winding 4 is a ferromagnetic member 12 having a first portion 14 of a varying cross-sectional area. In the shown embodiment the portion 14, which normally constitutes the plunger of a solenoid, is in the form of a bar tapering along its entire length. The edges 16 and 18 respectively, are connected to a casing 20 which constitutes the second portion of the member 12. The casing 20 is provided with an elongated aperture 22 through which aperture the electrical terminals 6 and 8 can pass, and even more importantly, through which rods 24 and 26 protrude to the outside of the casing for affixing the body 10 embedding the winding 4, onto a stationary surface 28 for immobilizing the winding with respect to the movable member 12. Further seen in the figure is a spring 30 located between, or affixed to the body 10 and the inner surface of the upper wall of the casing 20.

The operation of the device can now be readily understood. As voltage is applied across the terminals 6 and 8, current is flowing in the winding 4 producing excitation flux which is included in the portion 14 and casing 20. The mean path of flux is depicted in FIG. 1 by the broken line on the left hand side thereof only for clarity. It can be seen that the member 12 provides a gapless closed magnetic circuit or flux path, thus the commonly present working air gap losses inherently present in such devices are avoided. The configuration of the portion 14 of the ferromagnetic member 12, providing variations in the cross-section thereof, is responsible to the uneven distribution of the flux density therein resulting in the movement or stroke of the entire member 12 namely. the stroke of the plunger portion 14 together with the casing 20. which are moved relative to the immobilized winding 4. Depending on the direction of movement of the member 12, during the actuation of the device, the spring 30 is compressed or extended beyond its state of rest and upon the cessation of current flow in the winding it will return the member 12 to its non-actuated position of rest.

Figure 2:
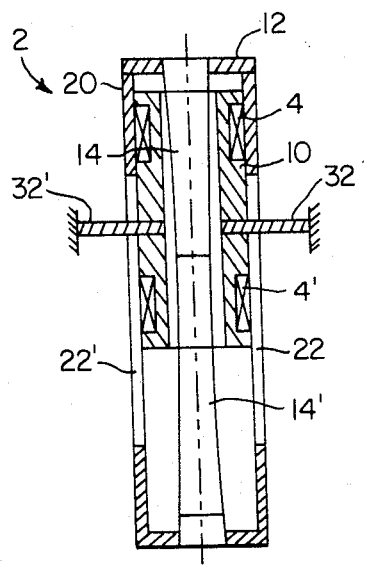
FIG. 2 is a cross sectional view across a second embodiment of a device structured as a push/pull solenoid.

Instead of using a biasing spring, a push/pull-type solenoid, or a double action linear motor shown in FIG. 2, can be used. Essentially this device 2 is composed of two of the devices of FIG. 1 housed in a single casing 20 having two slots or elongated apertures 22, 22′, facilitating the mounting of the device by means of rods 32, 32′, on both of its sides. The application of voltage to the winding 4 will cause the member 12 to move in one direction while the application of voltage to the winding 4′ will cause the excitation flux to be mainly induced in the member portion 14′ resulting in a movement in an opposite direction. Obviously, this movement may be utilized for operating a switch stationarily located adjacent one end of the member 12, or for operating a latch, or the like. Alternatively, the member 12 may constitute a latch by itself when properly configured.

Figure 3:
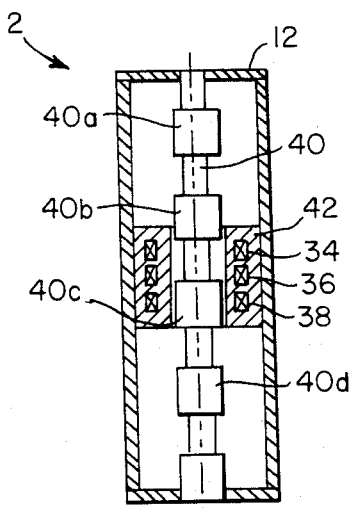
FIG. 3 is a cross-sectional view across a device structured as a stepped linear motor.
Figure 4:
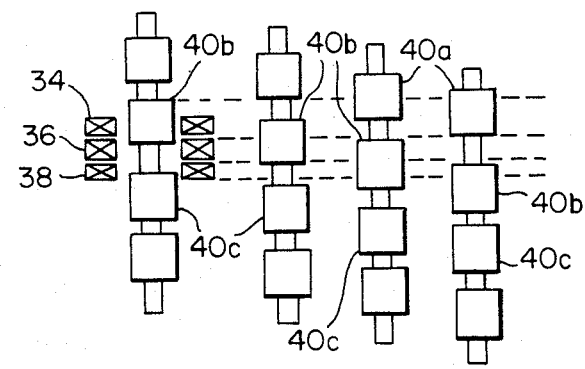
FIG. 4 is a schematic diagram explaining the operation of the stepped linear motor of FIG. 3.

Referring to FIGS. 3 and 4, there is illustrated the essential parts of a device 2 according to the present invention structured as a step motor. As seen the device includes three juxtaposed electrical windings 34, 36 and 38, each adapted to be independently activated. The plunger portion 40 of the member 12 is configured as a cylindrical bar or rod with integral, spaced-apart wide sections designated as sections 40a, 40b, 40c and 40d. Inter alia, the exact configuration and the inter-spacing between the windings and the sections are first determined for achieving a stepwise movement of the member 12 with a desired predetermined length of stroke for each step. Aided by the schematic illustration of FIG. 4. the operation of the device is as follows: Initially the section 40b is within the confinements of winding 34. As voltage is applied to winding 36 the flux generated by this winding will act on the closest variation of cross-section of the plunger portion 40, which is the section 40b, thus pulling the plunger downward one step until the section 40b is accommodated within its confinements. Similarly removing the voltage from across the winding 36 and applying the same across the winding 38 will pull the same section 40b downward again. Obviously the selected application of voltage to the different windings will cause the desired stepwise movement of the member 12 in the chosen direction. It should also be clear that the number of windings and spacing therebetween is not limited to any specific number and spacing and that more than one winding can be simultaneously activated. Also, as in the previously described embodiments, the member 12 may be immobilized (instead of immobilizing the windings) and thus the windings themselves which are embedded in a body 42, will move upon their activation.

Figure 5:
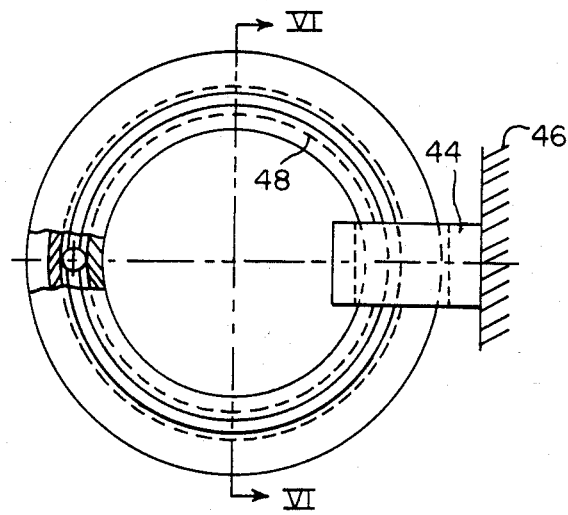
FIG. 5 is a plan view of a device according to the invention structured as a rotational motor.
Figure 6:
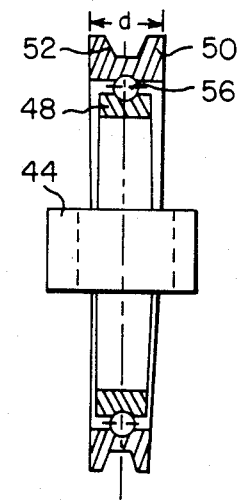
FIG. 6 is a cross-sectional view along line VI—VI of FIG. 5.

While the embodiments in FIGS. 1 to 3 illustrate devices for effecting linear movements. the same principles governing the invention can be applied to either continuously or stepwise rotating motors or even to combined rotating and linear motors or helical motors. In FIGS. 5 and 6 there is shown such a motor comprising a winding 44 stationarily affixed onto a surface 46 to which winding is attached a ring 48. Onto the outer surface of the ring 48 there is attached a ferromagnetic shaped annular member 50. In the shown example, the member 50 has a varying width, d, along its length and is provided with a trapezoidal groove 52 for accommodating a similarly cross-sectionally shaped drive belt. The member 50 is mounted on the ring 48 via a friction-reducing ball bearing 56. Instead of effecting the change in the cross-sectional area of the member 50 by changing its width, it is possible to vary the depth of its wall and the power output thereof could be obtained from its lateral sides by friction or by means of a gear. Similarly. the member 50 may be provided with teeth instead of, or in addition to, the groove 52. Also, the outer surface thereof may be designed as a friction surface for the utilization of the rotary movement. It is also possible to immobilize the outer member by affixing the same to the winding while forming an inner ferromagnetic ring with variations in its cross section so that this ring will become, under the influence of the magnetic flux, the driving or movable member. More than a single exciting winding may be distributed along the path of the ferromagnetic member. These windings may be controllably activated in accordance with various considerations including the positioning of the locations of the changes of the cross-sections of the member along the moving path with reference to the position of the winding. Alternatively, or even in addition, a continuous rotation may be achieved by the use of a mechanical energy storage means, such as a fly-wheel. as known per-se in the art.

Figure 7:
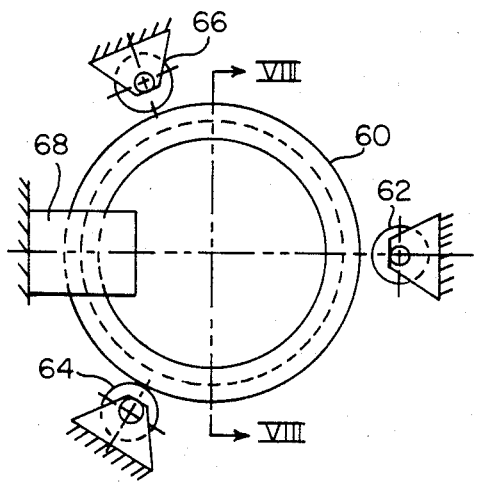
FIG. 7 is a plan view of a further embodiment of a device according to the invention structured as a rotational motor.
Figure 8:
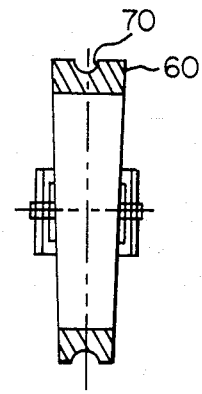
FIG. 8 is a cross-sectional view along line VIII—VIII of FIG. 7.

Turning now to FIGS. 7 and 8, still a further possible embodiment of the device according to the invention is illustrated similar to the rotary motor of the previous embodiment. Here, the ferromagnetic ring-like member 60 of a varying cross-section. is held in position by means of three stationarily affixed bearings 62, 64 and 66. A winding 68 is similarly immovably affixed. The rotary movement of the member 60 can be utilized by means of a drive belt coupled to the member 60 inside the peripheral groove 70. Various structural variations can be envisioned, for example, more than a single exciting winding can be positioned along the ring-like member 60′ the member 60 can be rotationally held in position from within the ring, or the like. The common feature, however, to all of the embodiments is the gapless path of the field induced in the member constituting the magnetic circuit.

While in the shown embodiments the variation in cross section is achieved by the change of the external configuration of at least a portion of the ferromagnetic member, it should be understood that a change in cross-section can just as well be achieved by changing internal configuration of the member. For example, considering a rod-type portion of a member the variation of cross-section can be obtained by means of a tapering bore or the like. Also, it should be clear that the member need not necessarily be symmetrical with respect to the device itself.

Instead of varying the configuration, or more specifically, the cross-sectional area of the member, thus changing the ability of the material of the member to permit the setting up of magnetic lines of force, and thereby modifying the magnetic field intensity, it is possible to achieve the same effect by changing the permeability of at least one portion of the member.

Figure 9:
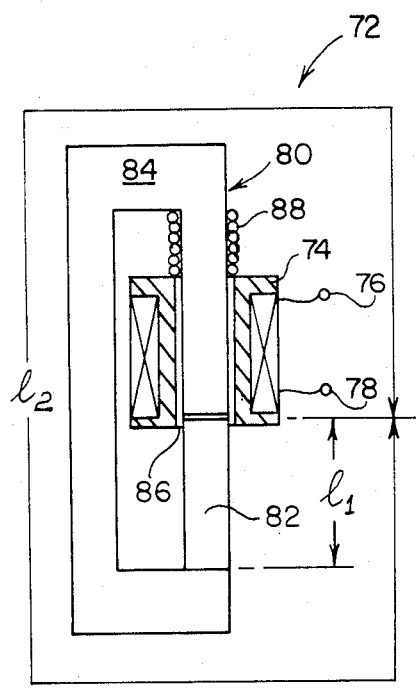
FIGS. 9 and 9A are cross-sectional views of a device, according to the invention, having a member made with a gap and with portions of different permeability.
Figure 10:
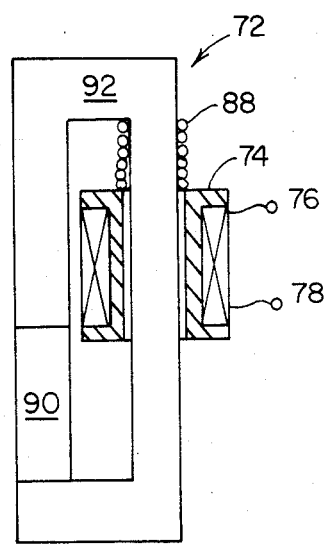
FIGS. 10 and 11 are cross-sectional views of still further embodiments of the device of FIG. 9.
Figure 11:
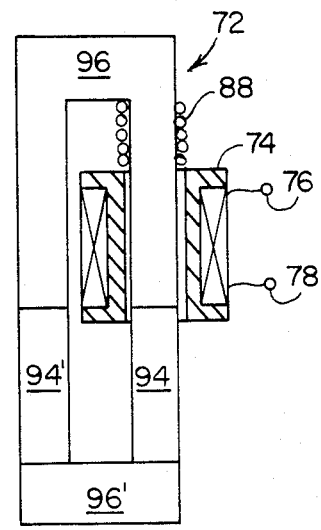

Examples of such embodiments are shown in FIGS. 9 to 11.

Figure 9A:
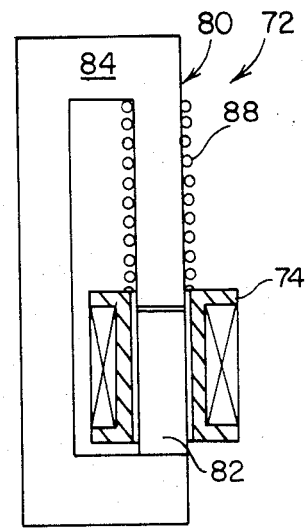

In FIGS. 9 and 9A there is illustrated an electromagnetic actuatable device 72 according to the invention, structured and operatable as a solenoid. The device 72 comprises a current carrying winding 74, having electrical terminals 76 and 78 for applying voltage thereacross. Partly disposed within the winding 74 is a ferromagnetic member 80 having a first portion 82 of a length $l_1$ and a permeability of $\mu_1$, and a second portion of a length $l_2$ and permeability of $\mu_2$. The length $l_1$ substantially corresponds to the length of the devices' stroke and, in general the relationship between these prechosen parameters for achieving maximum force, can be calculated by the formula:

$$\frac{\mu_1}{\mu_2} = \frac{l_1}{l_2 + 2l_1}$$

As seen in the figures, there may be provided a small air-gap 86 between the two portions of the member 80, which air gap remains constant during operation and has the effect of lowering the permeability of the portion 82. Thus in order to obtain the calculated ratio between the two portions, using two given materials of different permeabilities, an air gap may be made, e.g., at the junction between the two portions, which air gap will effectively lower the permeability of the portion 82 as the flux will have to transverse the gap 86 in its path through the member 80. Obviously. for mechanical and other reasons, instead of an air gap. the same space could be filled with a non-ferromagnetic material, such as plastic which has the same effect on the flux path.

The device 72 is further provided with a spring 88 for effecting the return of the movable part to its original position after actuation. The operation of the device is similar to the operation of the device of FIG. 1. Instead of the usage of a returning spring analogously to the embodiment of FIG. 2, two devices 72 could be arranged in a push/pull manner.

It should be pointed out that a combination of the two described measures for changing the ability of the member to permit the setting up of magnetic lines of force, could be used in a single device. Namely, the same or a different portion of a single member may be provided with a varying configuration or cross-sectional area, as well as with a material of a different permeability.

In FIG. 10 there is illustrated a device 72, similar to the device of FIG. 9. however, with the modification that the member portion 90. having a permeability which differs from the permeability of the member portion 92, is located in the member's limb which is not disposed inside the winding 74. In FIG. 11 there is shown still a further modification of the structure of the member in which there are more than two portions of a specified permeability. For example, member portions 94 and 94' have a first permeability while member portions 96 and 96' have a second permeability. Considerations with regard to the exact location of the higher or lower permeability along the member is left to the designer of a specific device. Also, it should be understood that the embodiments shown in FIGS. 9 to 10 merely exemplify possible constructions of the device according to the invention having members with portions of different permeability however, other types of devices, e.g., those described with connection to FIGS. 3 to 8 are also contemplated for members of changing permeabilities.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive. the scope of the invention being indicated by the appended claims rather than by the foregoing description, and all changes which come within the meaning and range of equivalency of the claims are therefore intended to be embraced therein.

What is claimed is:

1. An electromagnetic actuable device comprising:
   at least one current carrying winding member having electrical terminals for applying voltage thereacross; and
   a ferromagnetic member configured to provide a closed magnetic flux path for magnetic flux induced by the winding member being at least in proximity to said winding member for modifying the magnetic field intensity therethrough;
   one of said members being adapted to be immobilized with respect to the other member so that upon the application of voltage to said winding member the non-immobilized member is movable with respect to the other member in response to the force developed by said induced flux in interacting with said ferromagnetic member to produce a non-uniform distribution of flux density along said ferromagnetic member.

2. The device as claimed in claim 1 wherein said means for modifying magnetic field intensity comprises at least one portion of said ferromagnetic member having a non-uniform cross sectional area therealong.

3. The device as claimed in claim 1 wherein said means for modifying magnetic field intensity comprises at least one portion of said ferromagnetic member having a variation in the permeability of the material along said portion.

4. The device as claim in claim 1 wherein said ferromagnetic member has a first portion configured as plunger of a solenoid, the end portions of said plunger being in contact with a second portion configured as a casing for housing said winding member, said casing being provided with at least one aperture facilitating the immobilization of said winding member outside said casing.

5. The device as claimed in claim 4 further comprising spring means disposed between said winding member and said casing for effecting the return of the ferromagnetic member to its initial position relative the winding member, after actuation.

6. The device as claimed in claim 1 wherein said ferromagnetic member has a portion configured as a tapering bar.

7. The device as claimed in claim 1 wherein said ferromagnetic member has a portion configured as a bar having at least one wide section.

8. The device as claimed in claim 1 wherein said ferromagnetic member is shaped as a ring.

9. The device as claimed in claim 6 wherein said ring is rotationally held by friction reducing means.

10. The device as claimed in claim 1 wherein said ferromagnetic member is provided with an interruption of the material constituting a constant air gap in said ferromagnetic member.

11. The device as claimed in claim 1 wherein said ferromagnetic member has a first portion configured as plunger of a solenoid, the end portions of said plunger being made integral with a second portion configured as a casing for housing said winding member, said casing being provided with at least one aperture facilitating the immobilization of said winding member outside said casing.

* * * * *